US012600356B2

(12) United States Patent (10) Patent No.: US 12,600,356 B2
Gongora Flores et al. (45) Date of Patent: Apr. 14, 2026

(54) VEHICLE CONTROL METHOD AND VEHICLE CONTROL DEVICE

(71) Applicant: Nissan Motor Co., Ltd., Yokohama (JP)

(72) Inventors: Daniel Marcell Gongora Flores, Kanagawa (JP); Yuji Takada, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/715,463

(22) PCT Filed: Dec. 3, 2021

(86) PCT No.: PCT/JP2021/044489
§ 371 (c)(1),
(2) Date: May 31, 2024

(87) PCT Pub. No.: WO2023/100355
PCT Pub. Date: Jun. 8, 2023

(65) Prior Publication Data
US 2025/0026346 A1 Jan. 23, 2025

(51) Int. Cl.
*B60W 30/16* (2020.01)
*B60W 30/18* (2012.01)
*B60W 60/00* (2020.01)

(52) U.S. Cl.
CPC ...... *B60W 30/16* (2013.01); *B60W 30/18154* (2013.01); *B60W 60/001* (2020.02); *B60W 2554/802* (2020.02)

(58) Field of Classification Search
CPC ......... B60W 60/001; B60W 2554/802; B60W 30/16; B60W 30/18009; B60W 30/18154;
(Continued)

(56) References Cited

U.S. PATENT DOCUMENTS 11,079,762 B2 8/2021 Matsunaga et al.
2006/0025918 A1* 2/2006 Saeki .................... B60W 10/06
701/96
(Continued)

FOREIGN PATENT DOCUMENTS

JP 2001-225669 A 8/2001
JP 2019-156223 A 9/2019
(Continued)

*Primary Examiner* — Fadey S. Jabr
*Assistant Examiner* — Mario C Gonzalez
(74) *Attorney, Agent, or Firm* — Young Basile Hanlon & MacFarlane, P.C.

(57) ABSTRACT

A vehicle control method for causing an own vehicle to stop in a way that an interval between the own vehicle and a preceding vehicle coincides with a predetermined target distance includes: determining whether or not there is a crossing within a predetermined distance from the own vehicle ahead of the own vehicle and a traveling road on which the own vehicle travels includes a target lane in which a vehicle travels in the same direction as the own vehicle and an opposite lane; detecting a leading vehicle in the target lane in a section up to the crossing as a target vehicle and determining whether or not the own vehicle is a following vehicle positioned immediately behind the target vehicle; and when the own vehicle is a following vehicle, setting the target distance longer than the target distance when the own vehicle is not a following vehicle.

9 Claims, 7 Drawing Sheets

(58) Field of Classification Search
CPC ......... B60W 30/18159; B60W 30/181; B60W
2555/60; B60W 2552/53; G06V 20/588;
G06V 20/56; G06V 20/58; G06V 20/584;
G08G 1/133
See application file for complete search history.

(56) References Cited

U.S. PATENT DOCUMENTS

| | | | |
|---|---|---|---|
| 2018/0208199 A1* | 7/2018 | Fujita .................... | G01C 21/343 |
| 2019/0043353 A1* | 2/2019 | Kim ...................... | G05D 1/0088 |
| 2019/0286147 A1 | 9/2019 | Matsunaga et al. | |
| 2019/0286163 A1* | 9/2019 | Yasuda ................. | B60W 30/16 |
| 2019/0389465 A1* | 12/2019 | Ogino ........................ | B60T 7/22 |
| 2020/0231151 A1* | 7/2020 | Aoki .................... | G05D 1/0246 |
| 2021/0284153 A1* | 9/2021 | Baek ..................... | B60W 50/14 |

FOREIGN PATENT DOCUMENTS

| | | |
|---|---|---|
| JP | 2019-167039 A | 10/2019 |
| JP | 2021-060919 A | 4/2021 |
| JP | 2021-124467 A | 8/2021 |

* cited by examiner

VEHICLE CONTROL DEVICE

| OBJECT SENSOR | ~11 |

| VEHICLE SENSOR | ~12 |

| POSITIONING DEVICE | ~13 |

| MAP DB | ~14 |

| COMMUNICATION DEVICE | ~15 |

| NAVIGATION DEVICE | ~16 |

CONTROLLER 18

PROCESSOR 18a

STORAGE DEVICE 18b

ACTUATOR 17

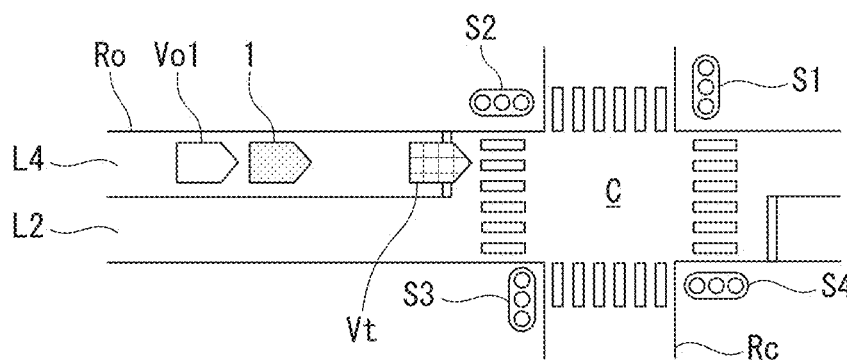

FIG. 4

CONTROLLER

```
                30                    31              32
        ┌──────────────┐    ┌──────────────┐  ┌──────────────┐
        │   OBJECT     │    │ OWN-VEHICLE  │  │    MAP       │
        │  DETECTION   │    │  POSITION    │  │ ACQUISITION  │
        │    UNIT      │    │  ESTIMATION  │  │    UNIT      │
        └──────────────┘    │    UNIT      │  └──────────────┘
                            └──────────────┘
```

| | | |
|---|---|---|
| OBJECT SENSOR — 11 | OBJECT DETECTION UNIT — 30 | OWN-VEHICLE POSITION ESTIMATION UNIT — 31 |
| | | MAP ACQUISITION UNIT — 32 |

OBJECT SENSOR — 11

DETECTION INTEGRATION UNIT — 33

VEHICLE SENSOR — 12

OBJECT TRACKING UNIT — 34

POSITION-IN-MAP CALCULATION UNIT — 35

POSITIONING DEVICE — 13

MAP DB — 14

TARGET TRAVEL TRAJECTORY GENERATION UNIT — 36

TARGET SITUATION DETECTION UNIT — 40

COMMUNICATION DEVICE — 15

TARGET VEHICLE DETECTION UNIT — 41

TARGET DISTANCE SETTING UNIT — 42

NAVIGATION DEVICE — 16

VEHICLE CONTROL UNIT — 37

ACTUATOR — 17

18

START

S1 — DETECT SITUATIONS AROUND OWN VEHICLE

S2 — ARE TARGET SITUATIONS DETECTED? — N

Y

S4 — TARGET VEHICLE DETECTION PROCESSING

S5 — IS TARGET VEHICLE DETECTED? — N

Y

S3

S6 — TARGET DISTANCE UPDATE PROCESSING

SET REGULAR TARGET DISTANCE AND TARGET INTER-VEHICLE DISTANCE

S7 — GENERATE TARGET TRAVEL TRAJECTORY

S8 — CONTROL OWN VEHICLE

END

F I G. 10

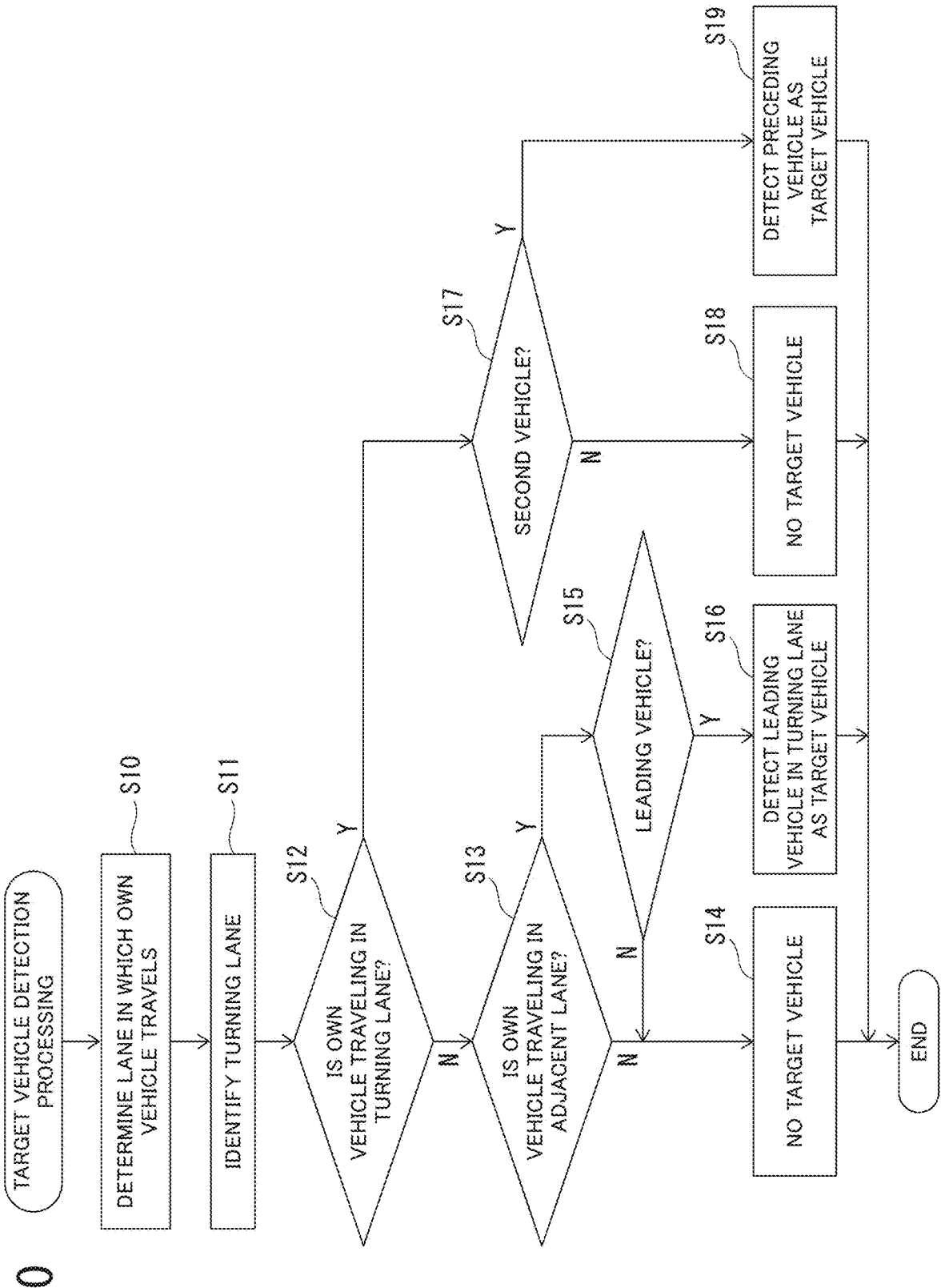

TARGET VEHICLE DETECTION PROCESSING

DETERMINE LANE IN WHICH OWN VEHICLE TRAVELS — S10

IDENTIFY TURNING LANE — S11

S12 — IS OWN VEHICLE TRAVELING IN TURNING LANE?

S13 — IS OWN VEHICLE TRAVELING IN ADJACENT LANE?

S14 — NO TARGET VEHICLE

S15 — LEADING VEHICLE?

S16 — DETECT LEADING VEHICLE IN TURNING LANE AS TARGET VEHICLE

S17 — SECOND VEHICLE?

S18 — NO TARGET VEHICLE

S19 — DETECT PRECEDING VEHICLE AS TARGET VEHICLE

END

VEHICLE CONTROL METHOD AND VEHICLE CONTROL DEVICE

TECHNICAL FIELD

The present invention relates to a vehicle control method and a vehicle control device.

BACKGROUND

In JP 2001-225669 A described below, a following travel device that when detecting that a preceding vehicle stops, decelerates an own vehicle to a minimum speed and causes the own vehicle to stop at a predetermined distance from the preceding vehicle is described.

SUMMARY

However, in some cases, as a result of a first other vehicle on a first road on which the own vehicle travels having stopped beyond a stop line of a crossing, the first other vehicle interferes with a course of a second other vehicle that is to turn from a second road crossing the first road to an opposite lane of the first road. When in the case where such a situation occurs, the own vehicle comes close to the first other vehicle and stops, the own vehicle prevents the first other vehicle from adjusting a stop position lest the first other vehicle interfere with the second other vehicle, as a result of which there is a risk that interference between the first other vehicle and the second other vehicle cannot be resolved.

An object of the present invention is to, even when a first other vehicle on a first road on which an own vehicle travels has stopped beyond a stop line of a crossing, facilitate a resolution of interference between a second other vehicle that is to turn from a second road crossing the first road to an opposite lane of the first road and the first other vehicle.

According to an aspect of the present invention, there is provided a vehicle control method for causing an own vehicle to stop in such a way that an interval between the own vehicle and a preceding vehicle or an interval between the own vehicle and a stop line coincides with a predetermined target distance, the vehicle control method including: determining whether or not within a predetermined distance from the own vehicle ahead of the own vehicle, a traveling road on which the own vehicle travels and a crossing road cross each other at a crossing at which a traffic signal is installed and the traveling road includes a target lane in which a vehicle travels in a same direction as a traveling direction of the own vehicle and an opposite lane in which a vehicle travels in an opposite direction to a traveling direction of the own vehicle; detecting a leading vehicle in the target lane in a section up to the crossing as a target vehicle; determining whether or not the own vehicle is a following vehicle positioned immediately behind the target vehicle or whether or not the target lane is sandwiched by the opposite lane and an adjacent lane and the own vehicle is a leading vehicle in the adjacent lane in a section up to the crossing; and when the own vehicle is the following vehicle, setting the target distance longer than the target distance when the own vehicle is not the following vehicle, or when the own vehicle is a leading vehicle in the adjacent lane, setting the target distance longer than the target distance when the own vehicle is not a leading vehicle in the adjacent lane.

According to an aspect of the present invention, it is possible to, even when a first other vehicle on a first road on which an own vehicle travels has stopped beyond a stop line of a crossing, facilitate a resolution of interference between a second other vehicle that is to turn from a second road crossing the first road to an opposite lane of the first road and the first other vehicle.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 3 is an explanatory diagram of another example of a target lane;

FIG. 4 is a block diagram of an example of a functional configuration of a controller;

FIG. 10 is a flowchart of an example of target vehicle detection processing.

DETAILED DESCRIPTION

Configuration

Figures 1, 2A, 2B:
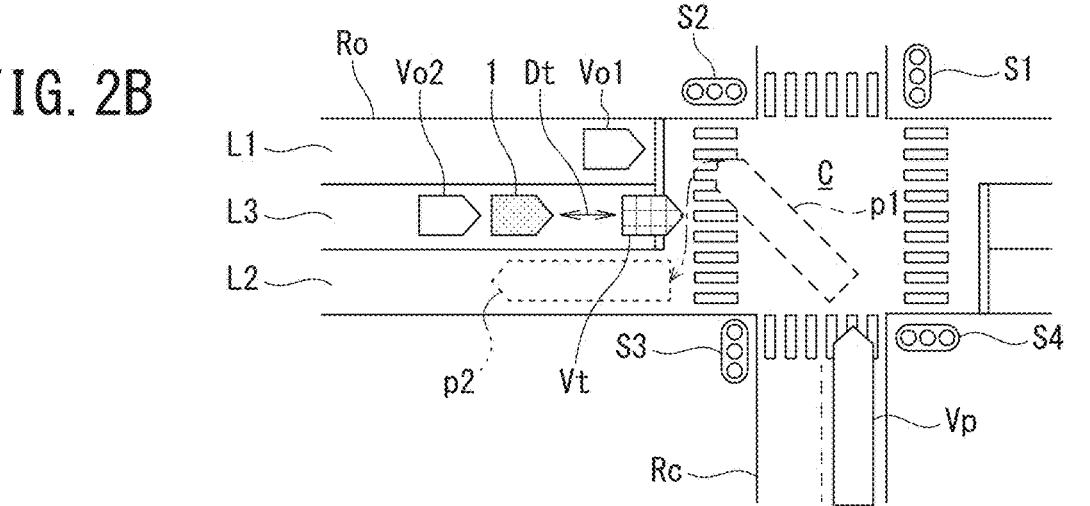
FIG. 1 is a schematic configuration diagram of an example of a vehicle control device of an embodiment.
FIG. 2A is an explanatory diagram of a vehicle control method of the embodiment.
FIG. 2B is another explanatory diagram of the vehicle control method of the embodiment.

FIG. 1 is a schematic configuration diagram of an example of a vehicle control device of an embodiment. An own vehicle 1 includes a vehicle control device 10 configured to control travel of the own vehicle 1. Travel control by the vehicle control device 10 includes autonomous driving control to cause the own vehicle 1 to self-drive without involvement of a driver, based on a travel environment around the own vehicle 1 and driving assistance control to assist driving of the own vehicle 1 by the driver by controlling at least one of drive, braking, and steering of the own vehicle 1. The driving assistance control may be, for example, self-steering, self-braking, preceding vehicle following control, constant speed travel control, lane keeping control, merging assistance control, or the like.

The vehicle control device 10 includes object sensors 11, vehicle sensors 12, a positioning device 13, a map database (map DB) 14, a communication device 15, a navigation device 16, actuators 17, and a controller 18.

The object sensors 11 include a plurality of object detection sensors of different types that are mounted on the own vehicle 1 and detect objects around the own vehicle 1, such as a laser radar, a millimeter-wave radar, a camera, and a light detection and ranging or laser imaging detection and ranging (LIDAR).

The vehicle sensors 12 are mounted on the own vehicle 1 and detect various information (vehicle signals) that can be acquired from the own vehicle 1. The vehicle sensors 12 include a vehicle speed sensor to detect vehicle speed of the own vehicle 1, wheel speed sensors to detect rotational speeds of respective tires of the own vehicle 1, a triaxial acceleration sensor to detect acceleration and deceleration in three axial directions of the own vehicle 1, a steering angle sensor to detect a steering angle of a steering wheel, a turning angle sensor to detect a turning angle of steered wheels, a gyro sensor to detect angular velocity of the own vehicle 1, a yaw rate sensor to detect a yaw rate, an accelerator sensor to detect accelerator opening of the own vehicle, and a brake sensor to detect a brake operation amount by the driver.

The positioning device 13 includes a global navigation satellite system (GNSS) receiver and, by receiving radio waves from a plurality of navigation satellites, measures a current position of the own vehicle 1. The GNSS receiver may be, for example, a global positioning system (GPS) receiver or the like. The positioning device 13 may be, for example, an inertial navigation device.

The map database 14 stores road map data. For example, the map database 14 may store high-definition map data (hereinafter, simply referred to as "high-definition map") that are suitable as map information for self-driving. The map database 14 may store map data for navigation (hereinafter, simply referred to as "navigation map").

The communication device 15 performs wireless communication with a communication device external to the own vehicle 1. A communication method used by the communication device 15 may be, for example, wireless communication via a public mobile telephone network, vehicle-to-vehicle communication, road-to-vehicle communication, or satellite communication.

The navigation device 16 recognizes a current position of the own vehicle, using the positioning device 13 and acquires map information at the current position from the map database 14. The navigation device 16 sets a travel route to a destination that a passenger inputs and performs route guidance for the passenger in accordance with the travel route. The navigation device 16 also outputs information about the set travel route to the controller 18. When performing autonomous driving control, the controller 18 causes the own vehicle 1 to self-drive in such a way that the own vehicle 1 travels along the travel route set by the navigation device 16.

The actuators 17 operate the steering wheel, the accelerator opening, and a braking device of the own vehicle in accordance with control signals output from the controller 18 and thereby generate vehicle behavior of the own vehicle. The actuators 17 include a steering actuator, an accelerator opening actuator, and brake control actuators. The steering actuator controls steering direction and the amount of steering of the own vehicle 1. The accelerator opening actuator controls the accelerator opening of the own vehicle. The brake control actuators control braking action of the braking device of the own vehicle.

The controller 18 is an electronic control unit that performs travel control of the own vehicle 1. The controller 18 includes a processor 18a and peripheral components, such as a storage device 18b. The processor 18a may be, for example, a CPU or an MPU.

The storage device 18b may include a semiconductor storage device, a magnetic storage device, an optical storage device, and the like. The storage device 18b may include registers, a cache memory, and a memory, such as a ROM and a RAM, that is used as a main storage device.

Functions of the controller 18, which will be described below, are achieved by, for example, the processor 18a executing computer programs stored in the storage device 18b.

Note that the controller 18 may be formed using dedicated hardware for performing information processing that will be described below. For example, the controller 18 may include a functional logic circuit that is implemented in a general-purpose semiconductor integrated circuit. For example, the controller 18 may include a PLD, such as an FPGA, and the like.

With reference to FIGS. 2A and 2B, an example of a travel control method performed by the controller 18 will be described.

The controller 18 performs travel control to cause the own vehicle to stop in such a way that an interval between the own vehicle 1 and a preceding vehicle (in the example in FIG. 2A, a vehicle Vt) or an interval between the own vehicle 1 and a stop line coincides with a predetermined target distance.

A reference sign Ro in FIG. 2A indicates a traveling road in which the own vehicle 1 travels, and a reference sign Rc indicates a crossing road that crosses the traveling road Ro within a predetermined distance ahead of the own vehicle 1. At a crossing C of the traveling road Ro and the crossing road Rc, traffic signals S1 to S4 are installed.

The traveling road Ro includes lanes L1 and L3 in which a vehicle travels in the same direction as a traveling direction of the own vehicle 1 and an opposite lane L2 in which a vehicle travels in the opposite direction to the traveling direction of the own vehicle 1. Such a situation around the own vehicle 1 is sometimes referred to as a "target situation" in the following description. The lanes L1 and L3 are lanes in which a vehicle is permitted (specified) to travel in the same direction as the traveling direction of the own vehicle 1 by the Road Traffic Law, and the opposite lane L2 is a lane in which a vehicle is permitted (specified) to travel in the opposite direction to the traveling direction of the own vehicle 1 by the Road Traffic Law.

In addition, the lanes L1 and L3 in which a vehicle travels in the same direction as the traveling direction of the own vehicle 1 are sometimes referred to as "target lanes".

In the example in FIG. 2A, the target lane L3 is a lane in which a vehicle traveling in the traveling direction of the own vehicle 1 is permitted to cross the opposite lane L2 and turn to the crossing road Rc at the crossing C by the Road Traffic Law. In addition, the target lane L1 is a lane in which the own vehicle 1 is permitted to at least either travel straight or turn to the opposite side to the opposite lane L2 at the crossing C by the Road Traffic Law.

An example of the target lane L3 is a turning lane in which only crossing the opposite lane L2 and turning to the crossing road Rc is permitted by the Road Traffic Law (a right-turn-only lane in an area where left-side travel is mandatory and a left-turn-only lane in an area where right-side travel is mandatory).

FIG. 3 is an explanatory diagram of another example of the target lane. A target lane LA may be a lane where a vehicle traveling in the traveling direction of the own vehicle 1 is permitted to not only cross the opposite lane L2 and turn to the crossing road Rc at the crossing C but also turn to the opposite side (in the example in FIG. 2A, left turn) or travel straight at the crossing C.

In the following description, the embodiment will be described using an example of a case where the turning lane L3 is set as a target lane. FIG. 2A is now referred to. A reference sign Vt indicates a preceding vehicle positioned immediately ahead of the own vehicle 1, and reference signs Vo1, Vo2, and Vp indicate other vehicles around the own vehicle 1. The own vehicle 1, the preceding vehicle Vt, the other vehicle Vo1, and the other vehicle Vo2 are standing because the traffic signal S1 is red. Since the preceding vehicle Vt is standing beyond a stop line, when the other vehicle Vp that is a large-size vehicle turns to the opposite lane L2 from the crossing road Rc, the preceding vehicle Vt sometimes interferes with a course of the other vehicle Vp.

In such a case, when the own vehicle 1 is standing immediately behind the preceding vehicle Vt, the preceding vehicle Vt cannot move backward, which prevents the preceding vehicle Vt from adjusting a stop position lest the preceding vehicle Vt interfere with the other vehicle Vp. Therefore, there is a risk that interference between the preceding vehicle Vt and the other vehicle Vp cannot be resolved.

Thus, the controller 18 detects a leading vehicle in the turning lane L3 in a section up to the crossing C as a target vehicle Vt and determines whether or not a positional relationship between the own vehicle 1 and the target vehicle Vt is a specific positional relationship that will be described below. For example, when the own vehicle 1 is a following vehicle positioned immediately behind the target vehicle Vt, the controller 18 may determine that the positional relationship between the own vehicle 1 and the target vehicle Vt is a specific positional relationship. In such a positional relationship, even when the preceding vehicle Vt has stopped beyond the stop line of the crossing, it is possible to secure a space that allows the preceding vehicle Vt to adjust a stop position lest the preceding vehicle Vt interfere with another vehicle that is to turn to the opposite lane L2 from the crossing road Rc, between the own vehicle 1 and the target vehicle Vt.

Thus, when the positional relationship between the own vehicle 1 and the target vehicle Vt is determined to be such a specific positional relationship, a longer target distance is set than when the positional relationship is determined not to be a specific positional relationship.

Because of this configuration, a longer space Dt is secured between the own vehicle 1 and the target vehicle Vt, as illustrated in, for example, FIG. 2B. As a result, since the own vehicle 1 does not prevent the preceding vehicle Vt from adjusting the stop position lest the preceding vehicle Vt interfere with the other vehicle Vp, it is possible to facilitate resolution of interference between the preceding vehicle Vt and the other vehicle Vp.

With reference to FIG. 4, functions of the controller 18 will be described in detail. The controller 18 includes an object detection unit 30, an own-vehicle position estimation unit 31, a map acquisition unit 32, a detection integration unit 33, an object tracking unit 34, a position-in-map calculation unit 35, a target travel trajectory generation unit 36, and a vehicle control unit 37.

The object detection unit 30 detects, based on detection signals from the object sensors 11, positions, attitudes, sizes, speeds, and the like of objects around the own vehicle 1, such as a vehicle, a motorcycle, a pedestrian, and an obstacle. The object detection unit 30 may detect information about objects around the own vehicle 1 from another vehicle or an infrastructure via the vehicle-to-vehicle communication or the road-to-vehicle communication performed by the communication device 15.

The own-vehicle position estimation unit 31 measures an absolute position of the own vehicle 1, that is, a position, an attitude, and speed of the own vehicle 1 with respect to a predetermined reference point, based on a measurement result by the positioning device 13 and odometry using detection results from the vehicle sensors 12.

The map acquisition unit 32 acquires map information that indicates a structure of a road on which the own vehicle 1 travels, from the map database 14. The map acquisition unit 32 may acquire map information from an external map data server through the communication device 15.

The detection integration unit 33 integrates a plurality of detection results that the object detection unit 30 respectively acquired from a plurality of object detection sensors, and outputs one detection result with respect to each object.

Specifically, the detection integration unit 33 calculates, from behaviors of an object respectively acquired from the object detection sensors, the most reasonable behavior of the object that minimize error, in consideration of error characteristics of the respective object detection sensors. For example, by using a sensor fusion technology, the detection integration unit 33 comprehensively evaluates detection results acquired by a plurality of types of sensors and acquires a more accurate detection result.

The object tracking unit 34 tracks an object detected by the object detection unit 30. Specifically, based on the detection result integrated by the detection integration unit 33, the object tracking unit 34 performs verification of identity (association) of an object between different times from behaviors of the object output at different times and predicts, based on the association, behavior of the object, such as speed.

The position-in-map calculation unit 35 estimates a position and an attitude of the own vehicle 1 on the map from the absolute position of the own vehicle 1, which is acquired by the own-vehicle position estimation unit 31, and the map information, which is acquired by the map acquisition unit 32. In addition, the position-in-map calculation unit 35 identifies the traveling road Ro on which the own vehicle 1 is traveling and also a lane in which the own vehicle 1 travels within the traveling road Ro.

The target travel trajectory generation unit 36 generates a target travel trajectory that the own vehicle 1 is caused to travel. The target travel trajectory may be information including, for example, a point sequence of points on the target trajectory that the own vehicle 1 is caused to travel and a target value of vehicle speed of the own vehicle 1 at each point in the point sequence. In the following description, a set of target values of vehicle speed (that is, a vehicle speed plan) of the own vehicle 1 on the target travel trajectory is referred to as a "target vehicle speed profile".

For example, the target travel trajectory generation unit 36 calculates, based on the current position and attitude of the own vehicle 1, a target route to a destination that is set by a navigation system or the like (not illustrated), and a surrounding environment around the own vehicle 1, a target travel trajectory that the own vehicle 1 is caused to travel. For example, the target travel trajectory generation unit 36 generates a route space map that represents a route and existence or nonexistence of an object around the own vehicle 1 and a risk map that is obtained by quantifying a degree of risk of a traveling field, and generates, based on motion characteristics of the own vehicle 1, the route space map, and the risk map, a target travel trajectory.

In addition, when another vehicle is standing ahead of the own vehicle 1, the target travel trajectory generation unit 36 generates a target vehicle speed profile that causes the own vehicle 1 to stop when an interval between the own vehicle 1 and the another vehicle coincides with a set target distance. In addition, when a traffic signal ahead of the own vehicle 1 is red, the target travel trajectory generation unit 36 generates a target vehicle speed profile that causes the own vehicle 1 to stop when an interval between the own vehicle 1 and a stop line coincides with the set target distance. In addition, when a preceding vehicle is traveling ahead of the own vehicle 1, the target travel trajectory generation unit 36 generates a target vehicle speed profile in such a way that inter-vehicle distance between the own vehicle 1 and the preceding vehicle coincides with a set target inter-vehicle distance.

For this purpose, the target travel trajectory generation unit 36 includes a target situation detection unit 40, a target vehicle detection unit 41, and a target distance setting unit 42.

The target situation detection unit 40 determines, based on the map database 14, detection results of the object sensors 11, and information about the surroundings of the own vehicle 1 acquired from another vehicle or an infrastructure via the vehicle-to-vehicle communication or the road-to-vehicle communication performed by the communication device 15, whether or not a situation ahead of the own vehicle 1 is the target situation described with reference to FIGS. 2A and 3.

When the target situation detection unit 40 determines that the situation ahead of the own vehicle 1 is the target situation, the target vehicle detection unit 41 detects a target vehicle Vt.

When a positional relationship between the own vehicle 1 and a leading vehicle in the turning lane L3 in the section up to the crossing C is a specific positional relationship that will be describe as an example below with reference to FIGS. 5A and 6A, the target vehicle detection unit 41 detects the leading vehicle as the target vehicle Vt.

Figure 5A:
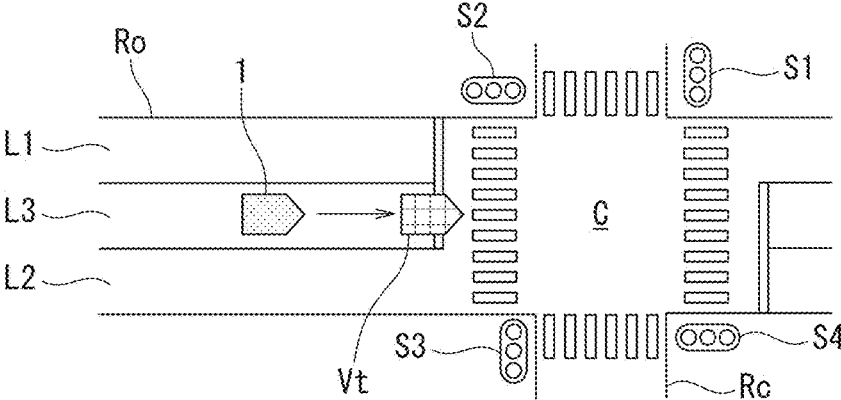
FIG. 5A is an explanatory diagram of an example of a target vehicle detected when an own vehicle exists in a target lane.

FIG. 5A is now referred to. The traveling road Ro includes the lane L1 and the turning lane L3 in which a vehicle travels in the same direction as the traveling direction of the own vehicle 1 and the opposite lane L2 in which a vehicle travels in the opposite direction to the traveling direction of the own vehicle 1, the lane L1 is an adjacent lane to the turning lane L3, and the turning lane L3 is sandwiched by the opposite lane L2 and the adjacent lane L1.

When the own vehicle 1 travels in the turning lane L3 and the own vehicle 1 is a second vehicle traveling in the turning lane L3 in a section up to the crossing C (that is, a following vehicle positioned immediately behind the leading vehicle in the turning lane L3 in the section up to the crossing C), the target vehicle detection unit 41 detects the leading vehicle as the target vehicle Vt.

Figure 5B:
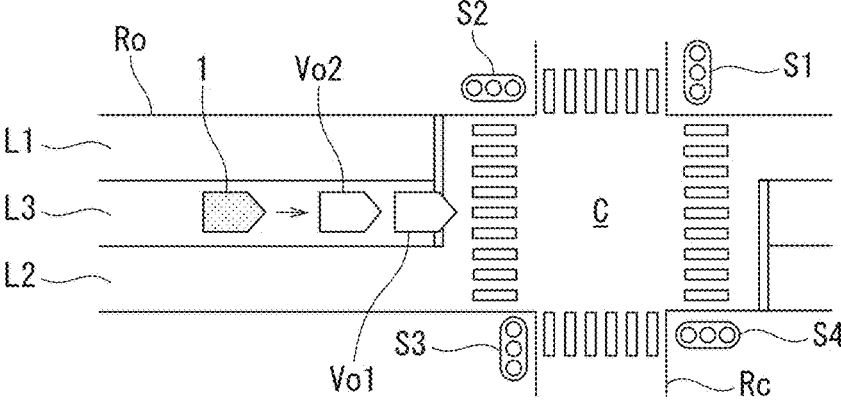
FIG. 5B is an explanatory diagram of an example in which no target vehicle is detected when the own vehicle exists in the target lane.

FIG. 5B is now referred to. When the own vehicle 1 travels in the turning lane L3 and the own vehicle 1 is not a second vehicle traveling in the turning lane L3 in the section up to the crossing C, the target vehicle detection unit 41 does not detect a leading vehicle Vo1 as a target vehicle.

Figure 6A:
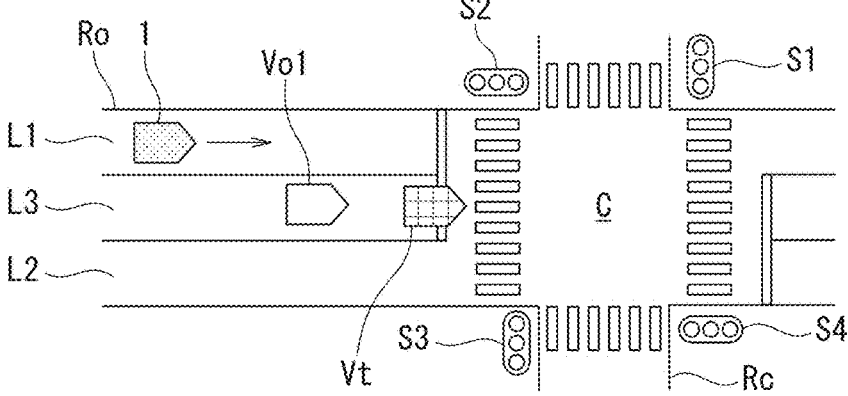
FIG. 6A is an explanatory diagram of an example of a target vehicle detected when the own vehicle exists in an adjacent lane to the target lane.

FIG. 6A is now referred to. The adjacent lane L1 to the turning lane L3 is a lane in which a vehicle travels in the same direction as the traveling direction of the own vehicle 1, and in the section up to the crossing C, the own vehicle 1 is a leading vehicle traveling in the adjacent lane L1. In this case, the target vehicle detection unit 41 detects a leading vehicle in the turning lane L3 in the section up to the crossing C as the target vehicle Vt. Note that the adjacent lane L1 may be, for example, an adjacent lane to the turning lane L3 on the opposite side to the opposite lane L2.

Figure 6B:
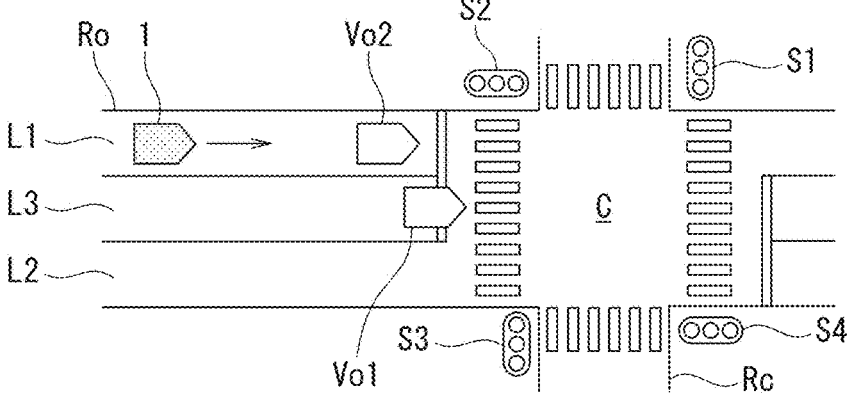
FIG. 6B is an explanatory diagram of an example in which no target vehicle is detected when the own vehicle exists in the adjacent lane to the target lane.

FIG. 6B is now referred to. When in the section up to the crossing C, the own vehicle 1 is not a leading vehicle traveling in the adjacent lane L1, the target vehicle detection unit 41 does not detect a leading vehicle Vo1 in the turning lane L3 in the section up to the crossing C as the target vehicle Vt.

The target distance setting unit 42 sets a target distance at which the own vehicle 1 is caused to stop with respect to another vehicle standing ahead of the own vehicle 1, a target distance at which the own vehicle 1 is caused to stop with respect to a stop line, or a target inter-vehicle distance between the own vehicle 1 and a preceding vehicle. The target travel trajectory generation unit 36 generates a target vehicle speed profile, based on the target distances and the target inter-vehicle distance that the target distance setting unit 42 set.

The target distance setting unit 42 sets a target distance and a target inter-vehicle distance when a target vehicle Vt is detected by the target vehicle detection unit 41 to longer distances than a target distance and a target inter-vehicle distance when no target vehicle Vt is detected.

Note that the target vehicle detection unit 41 may determine whether or not the target vehicle Vt has stopped beyond the stop line of the crossing C. The target distance setting unit 42 sets a target distance when the target vehicle Vt has stopped beyond the stop line of the crossing C to a longer distance than a target distance when no target vehicle Vt is detected, and does not have to increase a target distance when the target vehicle Vt has stopped without going beyond the stop line of the crossing C to a longer distance than the target distance when no target vehicle Vt is detected.

Figure 7A:
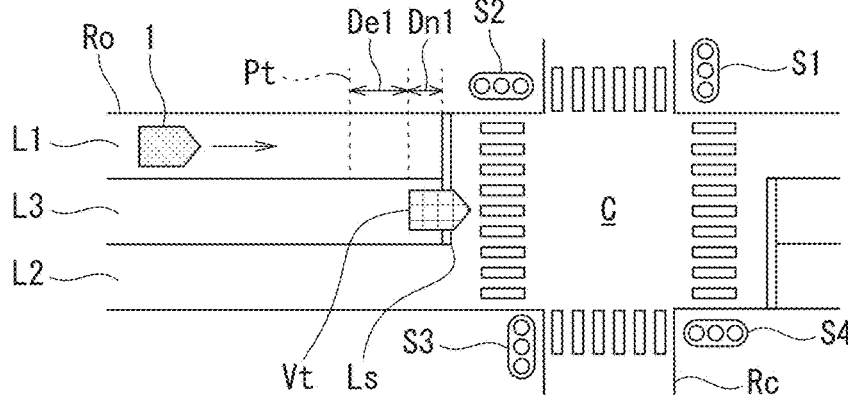
FIG. 7A is an explanatory diagram of an example of target distance at which the own vehicle is caused to stop with respect to a stop line.

FIG. 7A is now referred to. When the own vehicle 1 is traveling in the adjacent lane L1 and no target vehicle Vt is detected, the target distance setting unit 42 sets a target distance at which the own vehicle 1 is caused to stop with respect to a stop line Ls to a regular target distance Dn1.

On the other hand, when the own vehicle 1 is traveling in the adjacent lane L1 and a target vehicle Vt is detected, the target distance setting unit 42 sets the target distance at which the own vehicle 1 is caused to stop with respect to the stop line Ls to a distance (Dn1+De1) obtained by adding a predetermined distance De1 (for example, 2 m) to the regular target distance Dn1. That is, a target stop position Pt is set to a position located away from the stop line Ls by the distance (Dn1+De1) to the opposite side to the crossing C.

Note that setting the target stop position Pt in this way and the target vehicle Vt that has stopped beyond the stop line escaping to the adjacent lane L1 side ahead of the own vehicle 1 enable interference between the other vehicle Vp and the target vehicle Vt to be avoided.

Figure 7B:
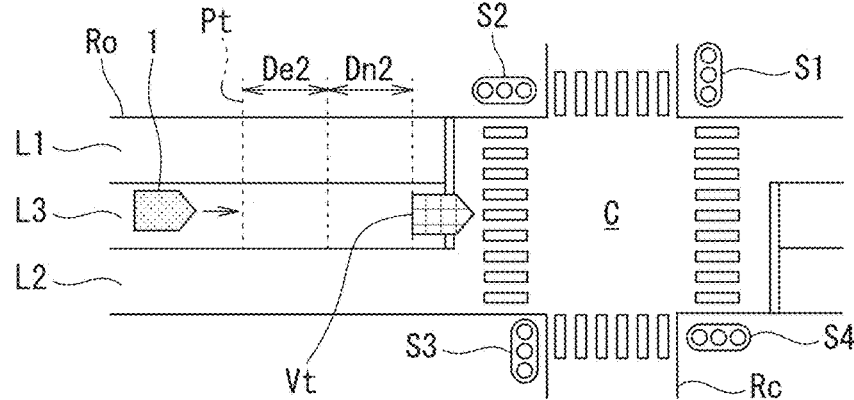
FIG. 7B is an explanatory diagram of an example of target distance at which the own vehicle is caused to stop with respect to a target vehicle.

FIG. 7B is now referred to. When the own vehicle 1 is traveling in the turning lane L3 and no target vehicle Vt is detected, the target distance setting unit 42 sets a target distance at which the own vehicle 1 is caused to stop with respect to a preceding vehicle standing ahead of the own vehicle (that is, the target vehicle Vt) to a regular target distance Dn2.

On the other hand, when the own vehicle 1 is traveling in the turning lane L3 and a target vehicle Vt is detected, the target distance setting unit 42 sets the target distance at which the own vehicle 1 is caused to stop with respect to a preceding vehicle standing ahead of the own vehicle to a distance (Dn2+De2) obtained by adding a predetermined distance De2 (for example, 3 m) to the regular target distance Dn2. That is, the target stop position Pt is set to a position located away from a rear end of the preceding vehicle by the distance (Dn2+De2) to the opposite side to the crossing C.

Figure 8A:
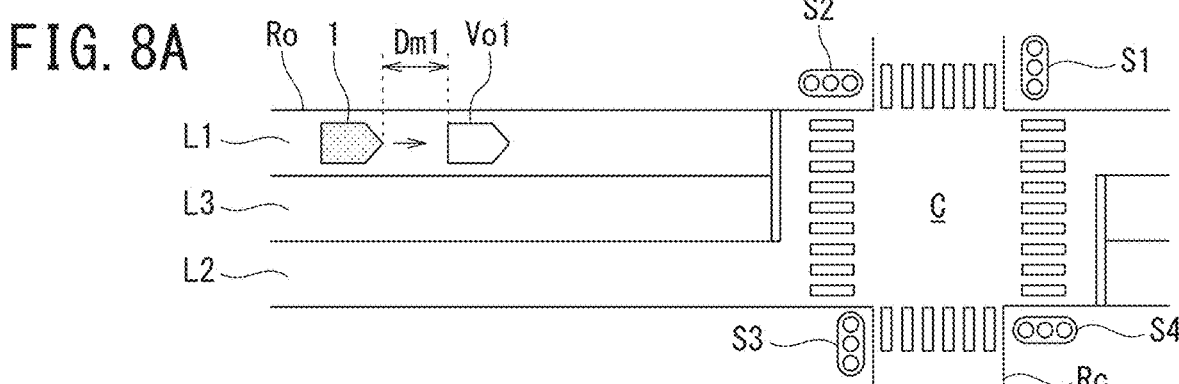
FIG. 8A is an explanatory diagram of an example of a regular target inter-vehicle distance.

FIG. 8A is now referred to. The target distance setting unit 42 sets target inter-vehicle distance Dm1 between the own vehicle 1 and a preceding vehicle Vo1, based on at least vehicle speed of the own vehicle 1. For example, the target distance setting unit 42 sets the target inter-vehicle distance Dm1 in such a way that time headway THW or time to collision TTC between the own vehicle 1 and the preceding vehicle Vo1 coincides with a predetermined value.

Figure 8B:
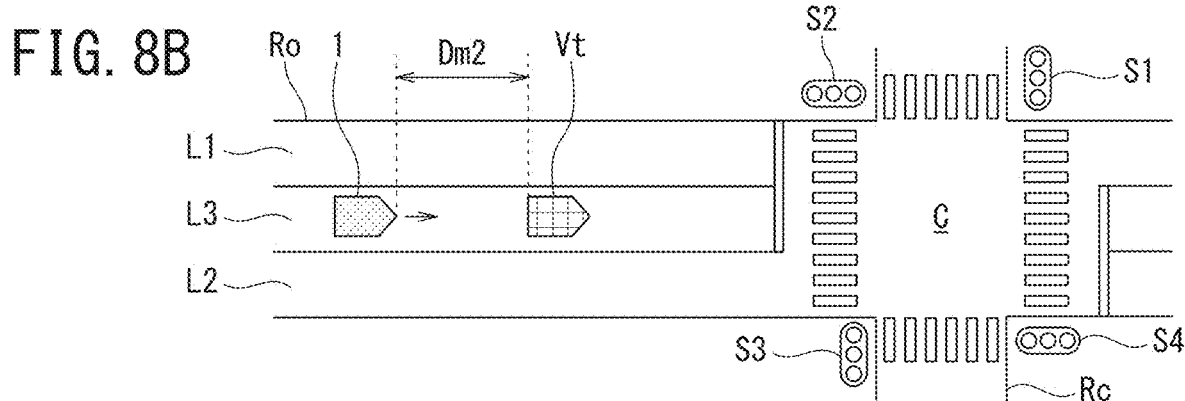
FIG. 8B is an explanatory diagram of an example of increased target inter-vehicle distance.

FIG. 8B is now referred to. When the own vehicle 1 is traveling in the turning lane L3 and a target vehicle Vt is detected, the target distance setting unit 42 sets target inter-vehicle distance Dm2 between the own vehicle 1 and the target vehicle Vt in such a way that the target inter-vehicle distance Dm2 is longer than the regular target inter-vehicle distance Dm1. For example, the target distance setting unit 42 may set the target inter-vehicle distance Dm2 by adding a predetermined distance to the regular target inter-vehicle distance Dm1 or may set the target inter-vehicle distance Dm2 in such a way that the time headway THW or the time to collision TTC becomes longer than those when the regular target inter-vehicle distance Dm1 is calculated.

By the own vehicle 1 and the preceding vehicle coming close to the crossing C while inter-vehicle distance between the own vehicle 1 and the preceding vehicle is controlled to the target inter-vehicle distance Dm1, the preceding vehicle of the own vehicle 1 that are traveling in the turning lane L3 is sometimes detected as a target vehicle Vt. In this case, in order to increase the inter-vehicle distance between the own vehicle and the preceding vehicle by changing the target inter-vehicle distance between the own vehicle 1 and the preceding vehicle from Dm1 to Dm2, deceleration of the own vehicle 1 sometimes becomes necessary. In this case, there is a risk that rapid deceleration causes vehicle behavior to suddenly change and a sense of discomfort to be given to the passenger.

Thus, it is preferable to limit deceleration to decelerate the own vehicle 1 in order to increase the inter-vehicle distance between the own vehicle 1 and the preceding vehicle to the target inter-vehicle distance Dm2 to a predetermined allowable deceleration (for example, $-3.4$ m/s$^2$) or less.

FIG. 4 is now referred to. The vehicle control unit 37 drives the actuators 17 in such a way that the own vehicle 1 travels along the target travel trajectory at speed in accordance with the target vehicle speed profile generated by the target travel trajectory generation unit 36.

Operation

Figure 9:
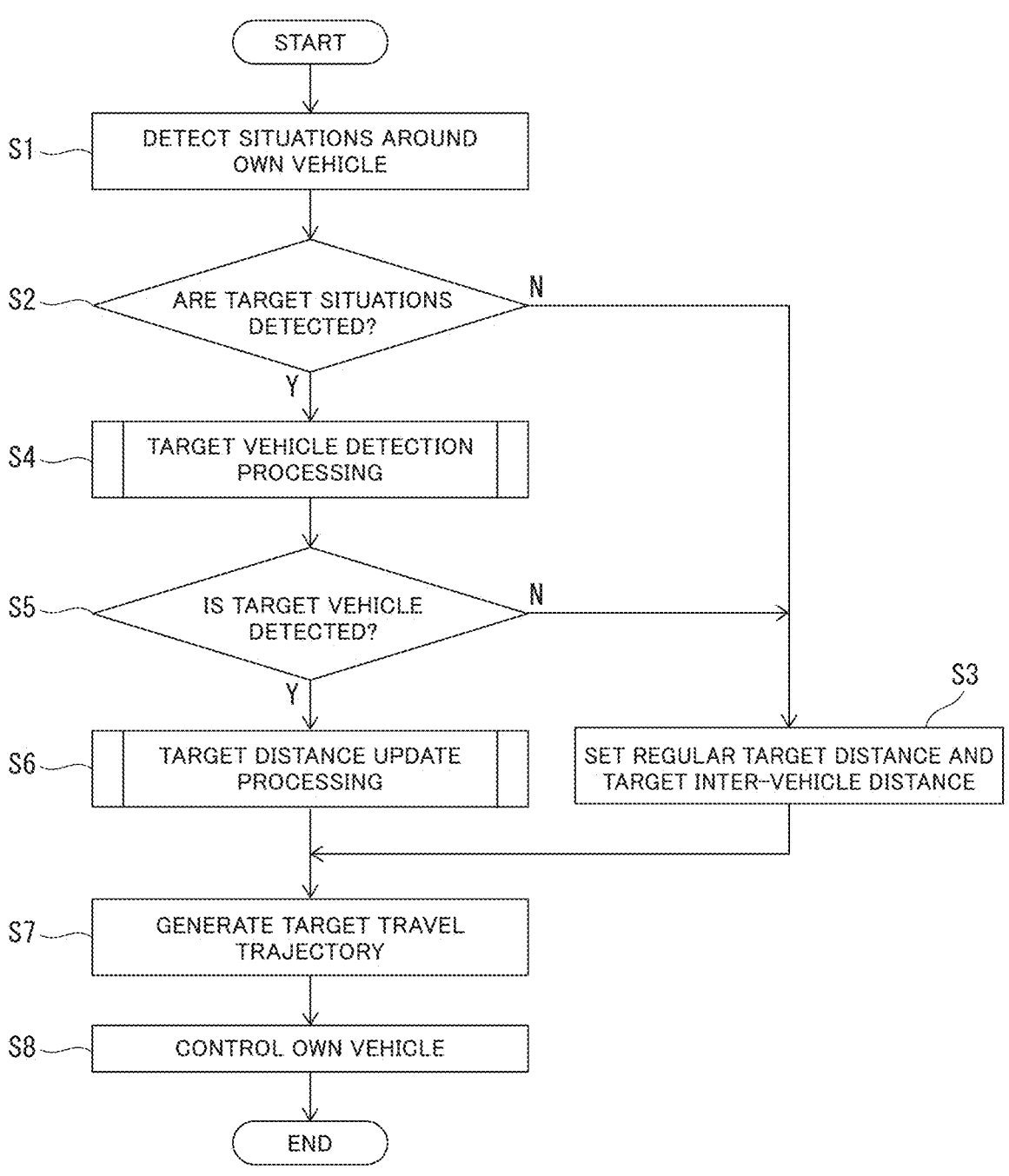
FIG. 9 is a flowchart of an example of the vehicle control method of the embodiment.

FIG. 9 is a flowchart of an example of a vehicle control method of the embodiment.

In step S1, the target situation detection unit 40 of the target travel trajectory generation unit 36 detects a situation around the own vehicle 1.

In step S2, the target situation detection unit 40 determines whether or not the situation ahead of the own vehicle 1 is the target situation. When the situation ahead of the own vehicle 1 is the target situation (step S2: Y), the process proceeds to step S4. When the situation ahead of the own vehicle 1 is not the target situation (step S2: N), the process proceeds to step S3.

In step S3, the target distance setting unit 42 sets target distances at which the own vehicle 1 is caused to stop with respect to a standing vehicle and a stop line and a target inter-vehicle distance between the own vehicle 1 and a preceding vehicle to regular values. Subsequently, the process proceeds to step S7.

In step S4, target vehicle detection processing is performed. The target vehicle detection processing will be described later.

When no target vehicle Vt is detected (step S5: N), the process proceeds to step S3. When a target vehicle Vt is detected (step S5: Y), the process proceeds to step S6.

In step S6, the target distance setting unit 42 performs target distance update processing. The target distance update processing will be described later.

In step S7, the target travel trajectory generation unit 36 generates a target travel trajectory that the own vehicle 1 is caused to travel. On this occasion, the target travel trajectory generation unit 36 generates a target vehicle speed profile, based on the target distances and the target inter-vehicle distance set in step S3 or S6.

In step S8, the vehicle control unit 37 drives the actuators 17 in such a way that the own vehicle 1 travels along the target travel trajectory at speed in accordance with the target vehicle speed profile generated by the target travel trajectory generation unit 36. Subsequently, the process terminates. FIG. 10 is a flowchart of an example of the target vehicle detection processing.

In step S10, the position-in-map calculation unit 35 determines a lane in which the own vehicle 1 travels.

In step S11, the target situation detection unit 40 identifies a turning lane L3. In step S12, the target vehicle detection unit 41 determines whether or not the own vehicle 1 is traveling in the turning lane L3. When the own vehicle 1 is traveling in the turning lane L3 (step S12: Y), the process proceeds to step S17. When the own vehicle 1 is not traveling in the turning lane L3 (step S12: N), the process proceeds to step S13.

In step S13, the target vehicle detection unit 41 determines whether or not the own vehicle 1 is traveling in an adjacent lane L1 to the turning lane L3. When the own vehicle 1 is traveling in the adjacent lane L1 (step S13: Y), the process proceeds to step S15. When the own vehicle 1 is not traveling in the adjacent lane L1 (step S13: N), the process proceeds to step S14.

In step S14, the target vehicle detection unit 41 determines that no target vehicle Vt is detected. Subsequently, the target vehicle detection processing terminates.

In step S15, the target vehicle detection unit 41 determines whether or not the own vehicle 1 is a leading vehicle in the adjacent lane L1. When the own vehicle 1 is a leading vehicle (step S15: Y), the process proceeds to step S16. When the own vehicle 1 is not a leading vehicle (step S15: N), the process proceeds to step S14.

In step S16, the target vehicle detection unit 41 detects a leading vehicle in the turning lane L3 as a target vehicle Vt. Subsequently, the target vehicle detection processing terminates.

On the other hand, in step S17, the target vehicle detection unit 41 determines whether or not the own vehicle 1 is a second vehicle traveling in the turning lane L3. When the own vehicle 1 is a second vehicle (step S17: Y), the process proceeds to step S19. When the own vehicle 1 is not a second vehicle (step S17: N), the process proceeds to step S18.

In step S18, the target vehicle detection unit 41 determines that no target vehicle Vt is detected. Subsequently, the target vehicle detection processing terminates.

In step S19, the target vehicle detection unit 41 detects a preceding vehicle of the own vehicle 1 as a target vehicle Vt. Subsequently, the target vehicle detection processing terminates.

Figure 11:
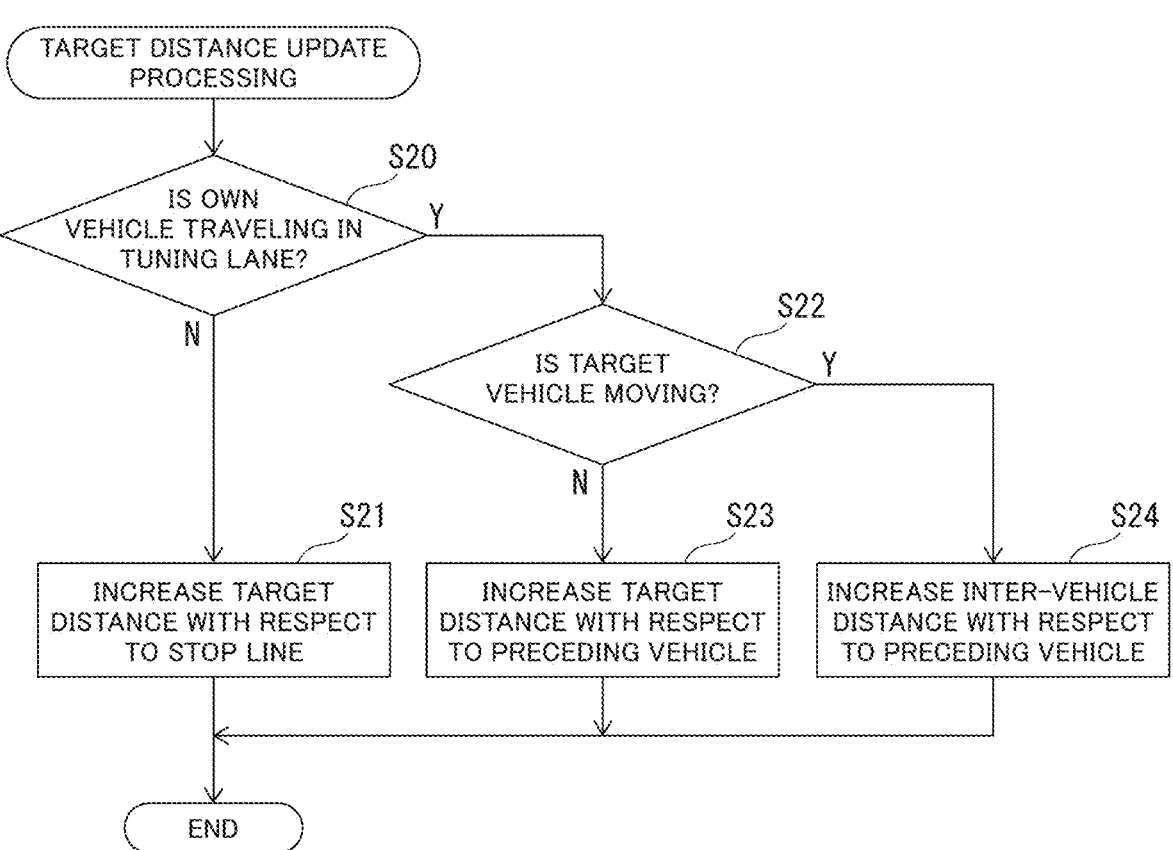
FIG. 11 is a flowchart of an example of target distance update processing.

FIG. 11 is a flowchart of an example of the target distance update processing.

In step S20, the target distance setting unit 42 determines whether or not the own vehicle 1 is traveling in the turning lane L3. When the own vehicle 1 is traveling in the turning lane L3 (step S20: Y), the process proceeds to step S22. When the own vehicle 1 is not traveling in the turning lane L3 (step S20: N), the process proceeds to step S21.

In step S21, the target distance setting unit 42 increases target distance at which the own vehicle 1 is caused to stop with respect to a stop line by a predetermined distance De1. Subsequently, the target distance update processing terminates.

In step S22, the target distance setting unit 42 determines whether or not the target vehicle Vt is moving. When the target vehicle Vt is moving (step S22: Y), the process proceeds to step S24. When the target vehicle Vt is not moving (step S22: N), the process proceeds to step S23.

In step S23, the target distance setting unit 42 increases target distance at which the own vehicle 1 is caused to stop with respect to the standing preceding vehicle by a predetermined distance De2. Subsequently, the target distance update processing terminates.

In step S24, the target distance setting unit 42 increases target inter-vehicle distance between the moving preceding vehicle and the own vehicle 1. Subsequently, the target distance update processing terminates.

Advantageous Effects of Embodiment (1) The controller 18 causes the own vehicle 1 to stop in such a way that an interval between the own vehicle 1 and a preceding vehicle or an interval between the own vehicle 1 and a stop line coincides with a predetermined target distance. The controller 18: determines whether or not within a predetermined distance from the own vehicle 1 ahead of the own vehicle 1, a traveling road on which the own vehicle 1 travels and a crossing road cross each other at a crossing at which a traffic signal is installed and the traveling road includes a target lane in which a vehicle travels in the same direction as the traveling direction of the own vehicle 1 and an opposite lane in which a vehicle travels in the opposite direction to the traveling direction of the own vehicle 1; detects a leading vehicle in the target lane in a section up to the crossing as a target vehicle Vt; determines whether or not the own vehicle 1 is a following vehicle positioned immediately behind the target vehicle Vt or whether or not the target lane is sandwiched by the opposite lane and an adjacent lane to the target lane and the own vehicle 1 is a leading vehicle in the adjacent lane in the section up to the crossing; and sets a longer target distance when the own vehicle 1 is a following vehicle than when the own vehicle 1 is not a following vehicle or sets a longer target distance when the own vehicle 1 is a leading vehicle in the adjacent lane than when the own vehicle 1 is not a leading vehicle in the adjacent lane.

Because of this configuration, even when a preceding vehicle Vt on the traveling road on which the own vehicle travels has stopped beyond a stop line of the crossing, it is possible to secure a space that allows the preceding vehicle Vt to adjust a stop position lest the preceding vehicle Vt interfere with another vehicle that is to turn to the opposite lane of the traveling road from the crossing road, between the own vehicle 1 and the target vehicle Vt. As a result, since the own vehicle 1 does not prevent the preceding vehicle Vt from moving lest the preceding vehicle Vt interfere with the another vehicle, it is possible to facilitate resolution of interference between the preceding vehicle Vt and the another vehicle.

(2) The controller 18 may determine whether or not the target vehicle Vt has stopped beyond a stop line before the crossing and set a longer target distance when the target vehicle Vt has stopped beyond the stop line before the crossing and the own vehicle is a following vehicle or a leading vehicle in the adjacent lane than when the target vehicle Vt has stopped without going beyond the stop line before the crossing.

Because of this configuration, when the preceding vehicle Vt has stopped beyond the stop line of the crossing, it is possible to facilitate resolution of interference between the preceding vehicle Vt and another vehicle.

(3) The target vehicle Vt may be a standing vehicle or a moving vehicle. Because of this configuration, it is possible to set target distance when the target vehicle Vt is standing longer than a regular target distance. By setting target inter-vehicle distance between the moving target vehicle Vt and the own vehicle 1 longer than a regular target inter-vehicle distance, it is possible to set target distance at which the own vehicle 1 is caused to stop with respect to the target vehicle Vt at a time point at which the target vehicle Vt stops longer than the regular target distance.

(4) When the own vehicle 1 is a following vehicle in the target lane positioned immediately behind the target vehicle Vt, the controller 18 may increase target distance at which the own vehicle 1 is caused to stop with respect to the standing target vehicle Vt by a predetermined distance.

Because of this configuration, it is possible to facilitate the preceding vehicle Vt moving lest the preceding vehicle Vt interfere with another vehicle attempting to turn from a crossing road.

(5) The controller 18 may calculate, based on at least vehicle speed of the own vehicle 1, a target inter-vehicle distance between the own vehicle 1 and a preceding vehicle and, when the own vehicle 1 is a following vehicle in the target lane traveling immediately behind the target vehicle Vt, increase inter-vehicle distance between the moving target vehicle Vt and the own vehicle 1 to a longer distance than the above-described target inter-vehicle distance.

Because of this configuration, it is possible to set target distance at which the own vehicle 1 is caused to stop with respect to the target vehicle Vt at a time point at which the target vehicle Vt stops longer than the regular target distance.

(6) The inter-vehicle distance between the target vehicle Vt and the own vehicle 1 may be increased to a longer distance than the target inter-vehicle distance in such a manner that deceleration does not exceed a predetermined allowable deceleration.

Because of this configuration, it is possible to prevent a rapid vehicle behavior from occurring or a sense of discomfort from being given to the passenger due to deceleration of the own vehicle 1 when the inter-vehicle distance between the target vehicle Vt and the own vehicle 1 is increased.

(7) When the own vehicle 1 is a leading vehicle in the adjacent lane, target distance at which the own vehicle 1 is caused to stop with respect to the stop line before the crossing may be increased by a predetermined distance.

Because of this configuration, it is possible to facilitate the preceding vehicle Vt moving lest the preceding vehicle Vt interfere with another vehicle attempting to turn from a crossing road.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Own vehicle
10 Vehicle control device
11 Object sensor
12 Vehicle sensor
13 Positioning device
14 Map database
15 Communication device
16 Navigation device
17 Actuator
18 Controller
18*a* Processor
18*b* Storage device
30 Object detection unit
31 Own-vehicle position estimation unit
32 Map acquisition unit
33 Detection integration unit
34 Object tracking unit
35 Position-in-map calculation unit
36 Target travel trajectory generation unit
37 Vehicle control unit
40 Target situation detection unit
41 Target vehicle detection unit
42 Target distance setting unit

The invention claimed is:

1. A vehicle control method for causing an own vehicle to stop in such a way that an interval between the own vehicle and a preceding vehicle coincides with a target distance, the vehicle control method comprising:

determining whether or not within a predetermined distance from the own vehicle ahead of the own vehicle, a traveling road on which the own vehicle travels and a crossing road cross each other at a crossing at which a traffic signal is installed and the traveling road includes a target lane in which a vehicle travels in a same direction as a traveling direction of the own vehicle and an opposite lane in which a vehicle travels in an opposite direction to a traveling direction of the own vehicle;

detecting a leading vehicle in the target lane in a section up to the crossing as a target vehicle;

determining whether or not a preceding vehicle positioned immediately ahead of the own vehicle is the target vehicle;

when the preceding vehicle positioned immediately ahead of the own vehicle is the target vehicle, setting the target distance longer than the target distance when the preceding vehicle positioned immediately ahead of the own vehicle is not the target vehicle, the target distance being an interval between the preceding vehicle having stopped and a target stop position of the own vehicle;

determining whether or not the target vehicle has stopped beyond a stop line before the crossing;

when the target vehicle has stopped beyond a stop line before the crossing and the preceding vehicle is the target vehicle, setting the target distance longer than the target distance when the target vehicle has stopped without going beyond a stop line before the crossing; and controlling at least one system or component of the own vehicle based on the set target distance.

2. The vehicle control method according to claim 1, wherein the target vehicle is a standing vehicle or a moving vehicle.

3. The vehicle control method according to claim 1 comprising, when the own vehicle is a following vehicle in the target lane positioned immediately behind the target vehicle, increasing the target distance at which the own vehicle is caused to stop with respect to a standing target vehicle by a predetermined distance.

4. The vehicle control method according to claim 3 comprising:

calculating, based on at least a vehicle speed of the own vehicle, a target inter-vehicle distance between the own vehicle and a preceding vehicle; and when the own vehicle is a following vehicle in the target lane traveling immediately behind the target vehicle, increasing inter-vehicle distance between a moving target vehicle and the own vehicle to a longer distance than the target inter-vehicle distance.

5. The vehicle control method according to claim 4, wherein the vehicle control method increases inter-vehicle distance between the target vehicle and the own vehicle to a longer distance than the target inter-vehicle distance in such a manner that deceleration does not exceed a predetermined allowable deceleration.

6. A vehicle control device configured to cause an own vehicle to stop in such a way that an interval between the own vehicle and a preceding vehicle coincides with a target distance, the vehicle control device comprising:

a controller configured to:

determine whether or not within a predetermined distance from the own vehicle ahead of the own vehicle, a traveling road on which the own vehicle travels and a crossing road cross each other at a crossing at which a traffic signal is installed and the traveling road includes a target lane in which a vehicle travels in a same direction as a traveling direction of the own vehicle and an opposite lane in which a vehicle travels in an opposite direction to a traveling direction of the own vehicle;

detect a leading vehicle in the target lane in a section up to the crossing as a target vehicle;

determine whether or not a preceding vehicle positioned immediately ahead of the own vehicle is the target vehicle;

when the preceding vehicle positioned immediately ahead of the own vehicle is the target vehicle, set the target distance longer than the target distance when the preceding vehicle positioned immediately ahead of the own vehicle is not the target vehicle, the target distance being an interval between the preceding vehicle having stopped and a target stop position of the own vehicle;

determine whether or not the target vehicle has stopped beyond a stop line before the crossing;

when the target vehicle has stopped beyond a stop line before the crossing and the preceding vehicle is the target vehicle, set the target distance longer than the target distance when the target vehicle has stopped without going beyond a stop line before the crossing; and control at least one system or component of the own vehicle based on the set target distance.

7. A vehicle control method for causing an own vehicle to stop in such a way that an interval between the own vehicle and a stop line coincides with a predetermined target distance, the vehicle control method comprising:

determining whether or not within a predetermined distance from the own vehicle ahead of the own vehicle, a traveling road on which the own vehicle travels and a crossing road cross each other at a crossing at which a traffic signal is installed and the traveling road includes a target lane in which a vehicle travels in a same direction as a traveling direction of the own vehicle and an opposite lane in which a vehicle travels in an opposite direction to a traveling direction of the own vehicle;

detecting a leading vehicle in the target lane in a section up to the crossing as a target vehicle;

determining whether or not the target lane is sandwiched by the opposite lane and an adjacent lane and the own vehicle is a leading vehicle in the adjacent lane in a section up to the crossing;

when the own vehicle is a leading vehicle in the adjacent lane, setting the target distance longer than the target distance when the own vehicle is not a leading vehicle in the adjacent lane; and controlling at least one system or component of the own vehicle based on the set target distance.

8. The vehicle control method according to claim 7, comprising:

determining whether or not the target vehicle has stopped beyond a stop line before the crossing; and when the target vehicle has stopped beyond a stop line before the crossing and the own vehicle is a leading vehicle in the adjacent lane, setting the target distance longer than the target distance when the target vehicle has stopped without going beyond a stop line before the crossing.

9. The vehicle control method according to claim 7 comprising, when the own vehicle is a leading vehicle in the adjacent lane, increasing the target distance at which the own vehicle is caused to stop with respect to a stop line before the crossing by a predetermined distance.

* * * * *